(12) United States Patent
Yoo

(10) Patent No.: US 8,421,522 B2
(45) Date of Patent: Apr. 16, 2013

(54) HIGH VOLTAGE GENERATOR AND METHOD OF GENERATING HIGH VOLTAGE

(75) Inventor: Pil Seon Yoo, Seoul (KR)

(73) Assignee: Hynix Semiconductor Inc., Gyeonggi-do (KR)

( * ) Notice: Subject to any disclaimer, the term of this patent is extended or adjusted under 35 U.S.C. 154(b) by 164 days.

(21) Appl. No.: 13/171,135

(22) Filed: Jun. 28, 2011

(65) Prior Publication Data

US 2012/0139619 A1 Jun. 7, 2012

(30) Foreign Application Priority Data

Dec. 3, 2010 (KR) ........................ 10-2010-0122903

(51) Int. Cl.
*G05F 1/10* (2006.01)
(52) U.S. Cl.
USPC .................................................. 327/536
(58) Field of Classification Search ............ 327/535, 327/536, 537
See application file for complete search history.

(56) References Cited

U.S. PATENT DOCUMENTS

| 5,436,587 | A  * | 7/1995 | Cernea ........................ 327/536 |
| 6,480,057 | B2 * | 11/2002 | Ogura ........................ 327/536 |
| 6,738,273 | B2 * | 5/2004 | Shearon ........................ 363/60 |
| 6,922,096 | B2 * | 7/2005 | Cernea ........................ 327/536 |
| 7,005,912 | B2 * | 2/2006 | Nonaka ........................ 327/536 |
| 7,583,131 | B2 * | 9/2009 | Kimura et al. ................ 327/534 |
| 8,072,257 | B2 * | 12/2011 | Ootani et al. ................. 327/536 |
| 8,164,379 | B2 * | 4/2012 | Chuang et al. ................ 327/536 |
| 8,198,941 | B2 * | 6/2012 | Lesso ........................ 330/297 |
| 8,222,953 | B2 * | 7/2012 | Nakamura ..................... 327/536 |
| 8,242,834 | B2 * | 8/2012 | Chuang et al. ................ 327/536 |

FOREIGN PATENT DOCUMENTS

| KR | 100347144 | 8/2002 |
| KR | 100813549 | 3/2008 |
| KR | 1020080048609 | 6/2008 |
| KR | 1020100088920 | 8/2010 |

OTHER PUBLICATIONS

Notice of Allowance issued from the Korean Intellectual Property Office on Sep. 24, 2012.

* cited by examiner

*Primary Examiner* — Jeffrey Zweizig
(74) *Attorney, Agent, or Firm* — IP & T Group LLP

(57) ABSTRACT

A high voltage generator includes a negative bias generator configured to generate a negative bias, a clock generator configured to generate a clock signal that toggles between a positive bias and the negative bias, a clock doubling circuit configured to raise the positive bias of the clock signal and to output the clock signal having the raised positive bias as a second clock signal, and a charge pump configured to generate a high voltage using the second clock signal having the raised positive bias.

22 Claims, 2 Drawing Sheets

HIGH VOLTAGE GENERATOR AND METHOD OF GENERATING HIGH VOLTAGE

CROSS-REFERENCE TO RELATED APPLICATION

Priority to Korean patent application number 10-2010-0122903 filed on Dec. 3, 2010, the entire disclosure of which is incorporated by reference herein, is claimed.

BACKGROUND

Exemplary embodiments relate to a high voltage generator and, more particularly, to a high voltage generator using a negative bias.

Semiconductor memory, such as nonvolatile memory, requires a high voltage of 5 to 20 V. To this end, high voltage generators including various forms of charge pumps are being developed.

In general, the charge pumps used in the high voltage generator have limited voltage levels due to the threshold voltages of transistors. In particular, as the source voltage of the transistor is increased, the threshold voltage thereof further rises because of a body effect. Consequently, the supply voltage has to be high. In order to overcome the body effect, improved charge pumps, such as body-free charge pumps and cross-coupled charge pumps, have been developed, but they require a large number of stages for generating high voltage. Furthermore, there are concerns with the increasing area and power consumption of the charge pumps previously developed because of the additional circuitry, such as an added capacitor, utilized therein.

BRIEF SUMMARY

According to exemplary embodiments of the present disclosure, the number of stages of charge pumps may be minimized, while a high voltage is obtained by using a negative bias.

An exemplary high voltage generator according to an aspect of the present disclosure includes a negative bias generator configured to generate a negative bias, a clock generator configured to generate a clock signal that toggles between a positive bias and a negative bias, a clock doubling circuit configured to raise the positive bias of the clock signal and to output the clock signal having the raised positive bias as a second clock signal, and a charge pump configured to generate a high voltage using the second clock signal having the raised positive bias.

The clock doubling circuit may include a capacitor, a negative bias transfer circuit configured to transfer the negative bias to an output terminal when the clock signal is at a first level, a capacitor charge circuit configured to charge the capacitor to a voltage level corresponding to a difference between the positive bias and the negative bias when the clock signal is at a first logic level, and a positive bias doubling circuit configured to raise the positive bias by the difference between the positive bias and the negative bias, which is charged to the capacitor, when the clock signal is at a second logic level and to transfer the raised positive bias to the output terminal.

The negative bias transfer circuit may include a first switching device coupled between the output terminal and a negative bias terminal, which supplies the negative bias.

The capacitor charge circuit may include a second switching device coupled between a positive bias terminal, which supplies the positive bias, and a first node, and a third switching device coupled between a second node and a negative bias terminal, which supplies the negative bias.

The positive bias doubling circuit may include a fourth switching device coupled between a positive bias terminal, which supplies the positive bias, and a second node, and a fifth switching device coupled between a first node and the output terminal.

Further, the capacitor may be coupled between the first node and the second node.

An exemplary method of generating a high voltage according to another aspect of the present disclosure includes generating a negative bias, generating a clock signal that toggles between a positive bias and the negative bias, raising the positive bias of the clock signal, and generating the high voltage using the clock signal having the raised positive bias.

Raising the positive bias may include outputting the negative bias when the clock signal is at a first logic level, charging a capacitor to a voltage level corresponding to a difference between the positive bias and the negative bias when the clock signal is at a first logic level, and raising the positive bias by the difference between the positive bias and the negative bias, which is charged to the capacitor, when the clock signal is at a second logic level and outputting the raised positive bias.

DESCRIPTION OF EMBODIMENTS

Hereinafter, some exemplary embodiments of the present disclosure will be described in detail with reference to the accompanying drawings. The figures are provided to allow those having ordinary skill in the art to understand the scope of the embodiments of the disclosure.

Figure 1:
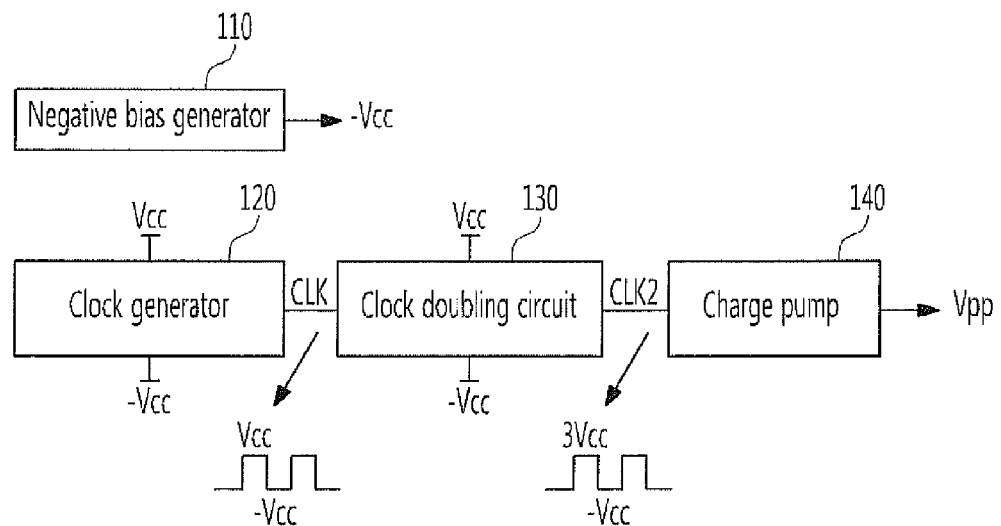
FIG. 1 is a block diagram of a high voltage generator according to an exemplary embodiment of this disclosure.

FIG. 1 is a block diagram of a high voltage generator according to an exemplary embodiment of this disclosure.

Referring to FIG. 1, the high voltage generator includes a negative bias generator 110, a clock generator 120, a clock doubling circuit 130, and a charge pump 140.

The negative bias generator 110 is configured to generate a negative bias –Vcc. The negative bias –Vcc may be a predetermined voltage set by the designer of the negative bias generator 110 at the time of its fabrication or afterwards. As shown in FIG. 1, the generated negative bias –Vcc is supplied to the clock generator 120.

The clock generator 120 is configured to generate a clock signal CLK, having a high level equivalent to a positive bias supplied to the clock generator 120 and a low level equivalent to the negative bias –Vcc supplied by the negative bias generator 110. For example, the clock generator 120 may generate the clock signal CLK which oscillates between a positive bias Vcc and the negative bias –Vcc. This clock signal CLK may be obtained by supplying the negative bias –Vcc to a terminal of a clock generator that is typically connected to the ground voltage. In other words, the clock generator 120 may be constructed as other clock generators known in the art, except that the terminal which is typically connected to ground in other clock generators is supplied with the negative bias −Vcc in the clock generator 120 of FIG. 1.

The clock doubling circuit 130 is configured to raise the high level of the clock signal CLK received from the clock generator 120 in order to generate a second clock CLK2. For example, where the clock signal CLK has a high level of Vcc, the clock doubling circuit 130 may generate a second clock signal CLK2 having a high level of 3 times Vcc (i.e., 3Vcc). In other words, the clock doubling circuit 130 may generate a second clock signal CLK2 which oscillates between a high level equal to 3Vcc and a low level equal to the negative bias −Vcc. Accordingly, in this case, the difference between the high-level potential of the second clock CLK2 and the low-level potential of the second clock signal CLK2 is 4 Vcc. Further, as shown in FIG. 1, the clock doubling circuit 130 of FIG. 1 uses the positive bias Vcc and the negative bias −Vcc to raise the high level of the clock signal CLK above the positive bias Vcc.

The charge pump 140 is configured to generate a high voltage Vpp using the second clock signal CLK2 having the raised high level. That is, the charge pump 140 inputs the second clock signal CLK2 from the clock doubling circuit 130 and outputs the high voltage Vpp.

Figure 2:
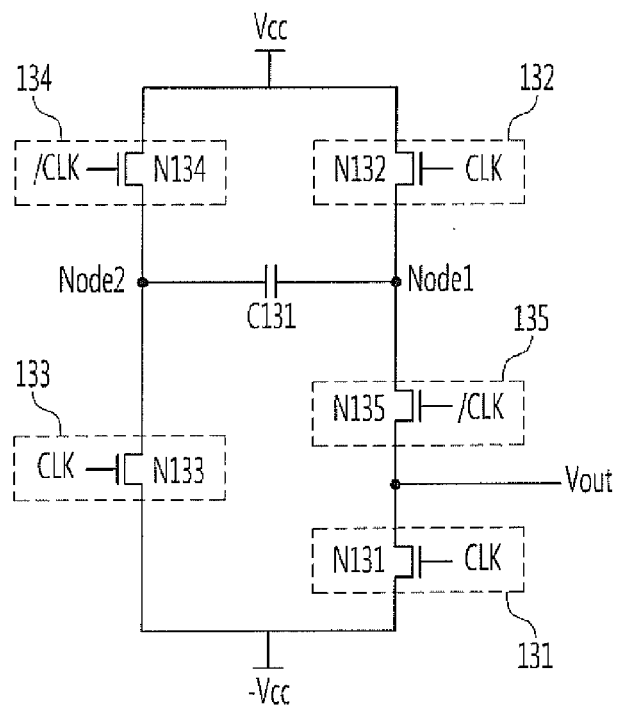
FIG. 2 is a circuit diagram showing a clock doubling circuit of FIG. 1.

FIG. 2 is a circuit diagram showing the clock doubling circuit 130 of FIG. 1.

Referring to FIG. 2, the clock doubling circuit 130 includes a capacitor C131, a negative bias transfer circuit 131, capacitor charge circuits 132 and 133, and positive bias doubling circuits 134 and 135.

The capacitor C131 is used to raise the high level of the clock signal CLK. The capacitor C131 is coupled between a first node Node1 and a second node Node2.

The negative bias transfer circuit 131 transfers a negative bias (for example, the negative bias −Vcc) to an output terminal in response to the clock signal CLK received from the clock generator 120. More specifically, the negative bias transfer circuit 131 may transfer the negative bias −Vcc when the clock signal CLK is at a high level.

To this end, the negative bias transfer circuit 131 includes a first switching device coupled between the output terminal and a negative bias terminal.

The first switching device may be implemented using a first NMOS transistor N131. The first NMOS transistor N131 is turned on when the clock signal CLK is at a high level, thereby coupling the negative bias terminal and the output terminal.

The capacitor charge circuits 132 and 133 are configured to charge the capacitor C131 to a voltage equal to the difference in voltage of the positive bias and the negative bias (that is, the capacitor is charged to 2Vcc corresponding to a voltage difference between the positive bias Vcc and the negative bias −Vcc) in response to the clock signal CLK. More specifically, the capacitor charge circuits 132 and 133 may charge the capacitor C131 when the clock signal CLK is at a high level.

To this end, the capacitor charge circuits 132 and 133 include a second switching device 132 and a third switching device 133, respectively. The second switching device 132 is coupled between a positive bias terminal and the first node Node1, while the third switching device 133 is coupled between the second node Node2 and the negative bias terminal.

The second switching device 132 may be implemented using a second NMOS transistor N132. The second NMOS transistor N132 is turned on when the clock signal CLK is at a high level, thereby coupling the positive bias terminal and the first node Node1. Accordingly, the positive bias Vcc is supplied to one terminal of the capacitor C131.

Similarly, the third switching device 133 may be implemented using a third NMOS transistor N133. The third NMOS transistor N133 is turned on when the clock signal CLK is at a high level, thereby coupling the negative bias terminal and the second node Node2. Accordingly, the negative bias −Vcc is supplied to the other terminal of the capacitor C131.

Accordingly, since the positive bias Vcc and the negative bias −Vcc are supplied to opposite terminals of the capacitor C131, the capacitor C131 is charged to 2Vcc, which is the voltage difference between the positive bias Vcc and the negative bias −Vcc.

The positive bias doubling circuits 134 and 135 are configured to raise the positive bias Vcc by a voltage equal to the voltage charged to the capacitor C131 when the clock signal CLK is at a low level. Further, the positive bias doubling circuits 134 and 135 are configured to transfer the raised positive bias to the output terminal. For example, the positive bias doubling circuits 134 and 135 may raise the positive bias Vcc by a voltage of 2Vcc charged to the capacitor C131 and may transfer the raised voltage of 3Vcc to the output terminal. As shown in FIG. 2, the clock signal CLK may be inverted to produce the inverted clock signal /CLK, which can then be inputted to the positive bias doubling circuits 134 and 135. By using the inverted clock signal /CLK, the positive bias doubling circuits 134 and 135 can be enabled when the clock signal CLK is at a low level.

To this end, the positive bias doubling circuits 134 and 135 include a fourth switching device 134 and a fifth switching device 135. The fourth switching device 134 is coupled between the positive bias terminal and the second node Node2, and the fifth switching device 135 is coupled between the first node Node1 and the output terminal.

The fourth switching device 134 may be implemented using a fourth NMOS transistor N134. The fourth NMOS transistor N134 is turned on when the inverted clock signal /CLK is at a high level (i.e., when the clock signal CLK is at a low level), thereby coupling the positive bias terminal and the second node Node2. Accordingly, the positive bias Vcc is supplied to the other terminal of the capacitor C131.

Similarly, the fifth switching device 135 may be implemented using a fifth NMOS transistor N135. The fifth NMOS transistor N135 is turned on when the inverted clock signal /CLK is at a high level (i.e., when the clock signal CLK is at a low level), thereby coupling the first node Node1 and the output terminal. When the fifth switching device 135 couples the first node Node1 to the output terminal, a voltage of 3Vcc at the first node Node1 is passed to the output terminal. The voltage at the first node Node1 is equal to 3Vcc because the first node Node1, which was previously charged to 2Vcc by the capacitor C131, is further raised to 3Vcc when the fourth switching device 134 supplies the positive bias Vcc to the other terminal of the capacitor C131. Accordingly, the clock doubling circuit 130 can raise a positive bias Vcc to a voltage of 3Vcc and output a second clock signal CLK2 having a high level equal to the voltage of 3Vcc through the output terminal.

In the exemplary embodiment of FIG. 2, an example in which the first to fifth switching devices are implemented using NMOS transistors has been described, but this disclosure is not limited thereto. For example, all switching devices capable of transferring voltage in response to the clock signal may be used to implement the first to fifth switching devices. It is to be noted that threshold voltages of the NMOS transistors have not been taken into consideration, in the case where the first to fifth switching devices are implemented using the NMOS transistors as in the exemplary embodiment of this disclosure.

Figure 3:
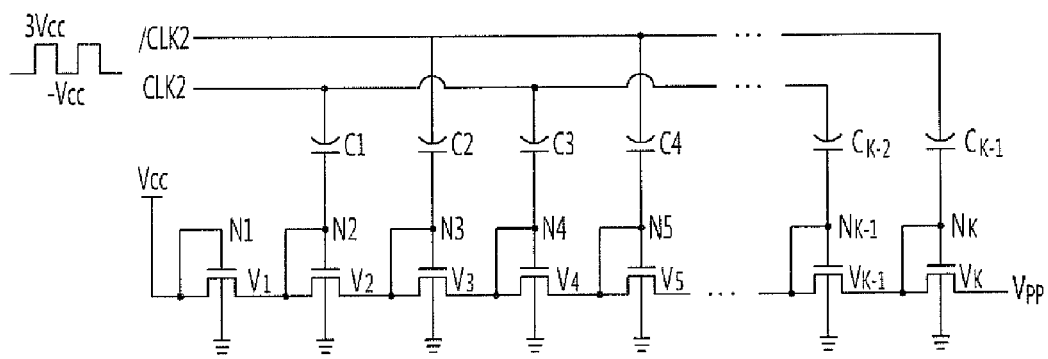
FIG. 3 is a circuit diagram showing a charge pump of FIG. 1.

FIG. 3 is a circuit diagram showing the charge pump 140 of FIG. 1.

Referring to FIG. 3, the charge pump 140 includes first to $k^{th}$ transistors N1 to Nk and capacitors C1 to Ck-1. The first to $k^{th}$ transistors N1 to Nk are each diode-coupled so that they operate as a diode. Further, the first to $k^{th}$ transistors N1 to Nk are coupled in series such that a terminal of one transistor is coupled to a terminal of another transistor. Meanwhile, the capacitors C1 to Ck-1 are coupled between the gates of the second to $k^{th}$ transistors N2 to Nk, respectively, and one of two clock input terminals. The two clock input terminals are for inputting the second clock signal CLK2 and its inverted signal /CLK2. Additionally, as shown in FIG. 3, each of the first to $k^{th}$ transistors may be an NMOS transistor.

Herein, it is assumed that a charge pump composed of one transistor (for example, N2) and one capacitor (for example, C1) is a unit charge pump. Accordingly, the charge pump of FIG. 3 may be said to be a $(k-1)^{th}$ stage charge pump. As shown in FIG. 3, the second clock signal CLK2 may be supplied to odd-numbered capacitors, such as the first, the third, and the fifth capacitors C1, C3, and C5, while the inverted second clock signal /CLK2 may be supplied to even-numbered capacitors, such as the second and the fourth capacitors C2 and C4.

The charge pump 140 is configured to generate a high voltage Vpp having a high voltage level that is greater than the positive bias Vcc. A further description of the operation of the charge pump 140 is provided below.

The inverted second clock signal /CLK2 is an inverted version of the second clock signal CLK. Therefore, the inverted second clock signal /CLK2 does not overlap with the second clock signal CLK2. That is, when the second clock signal CLK2 is at a high level, the inverted second clock signal /CLK2 is at a low level, and when the second clock signal CLK2 is at a low level, the inverted second clock signal /CLK2 is at a high level. Furthermore, when the second clock signal CLK2 is at a high level, the first capacitor C1 is charged with electric charges. Then, when the inverted second clock signal /CLK2 subsequently transitions to a high level, electric charges stored in the first capacitor C1 are discharged to the second capacitor C2. In general, whenever the voltage level of the second clock signal CLK2 changes, electric charges stored in a capacitor of one stage are transferred to a capacitor in the next stage. Accordingly, the voltage level of the output voltage of each stage is raised.

That is, while the second clock signal CLK2 and the inverted second clock signal /CLK2 periodically toggle, a voltage difference between both terminals of each of the capacitors C1 to Ck-1 is increased, and thus, the output voltage is raised. In this charge pumping method, while the first capacitor C1 is pumped to precharge the second capacitor C2, a voltage difference between both terminals of the second capacitor C2 is raised by means of a charge sharing operation between the first and the second capacitors C1 and C2.

In an exemplary embodiment of this disclosure, a voltage level of a node V1 becomes five times Vcc (i.e., 5Vcc) when the second clock signal CLK2 is at a high level, and a voltage level of a node V2 becomes nine times Vcc (i.e., 9Vcc) when the second clock signal /CLK2 is at a high level.

Assuming that the high voltage generator according to the exemplary embodiment of FIG. 1 uses the positive bias Vcc of 2.3 V, then a second clock signal CLK2 having a swing width of 9.2 V (that is, a swing width of 4Vcc) is theoretically supplied to a charge pump 140. Accordingly, the number of stages of pumps can be reduced, and a high voltage Vpp can be generated.

In a known high voltage generator, assuming that the body effect and a division effect due to the coupling capacitor are disregarded and the threshold voltage of each transistor is 0.5 V, when a positive bias voltage of 2.3 V and a three-stage charge pump are used, a high voltage Vpp of about 7.7 V may be obtained. This determination is reached based upon Equation 1 below.

$$Vpp=(N+1)Vcc-N*Vth \text{ } (N\text{: the number of stages of pumps, } Vcc \text{ is a bias, and } Vth=0.5\text{ V})$$ [Equation 1]

In contrast, in a high voltage generator according to FIG. 1, assuming that the threshold voltage of each transistor is 0.5 V, when a positive bias voltage of 2.3 V and a three-stage charge pump 140 are used, a high voltage Vpp of about 28.4 V may be obtained. This is because the second clock signal CLK2 has a swing width of 9.2 V (=4Vcc=4*2.3 V).

Figure 4:
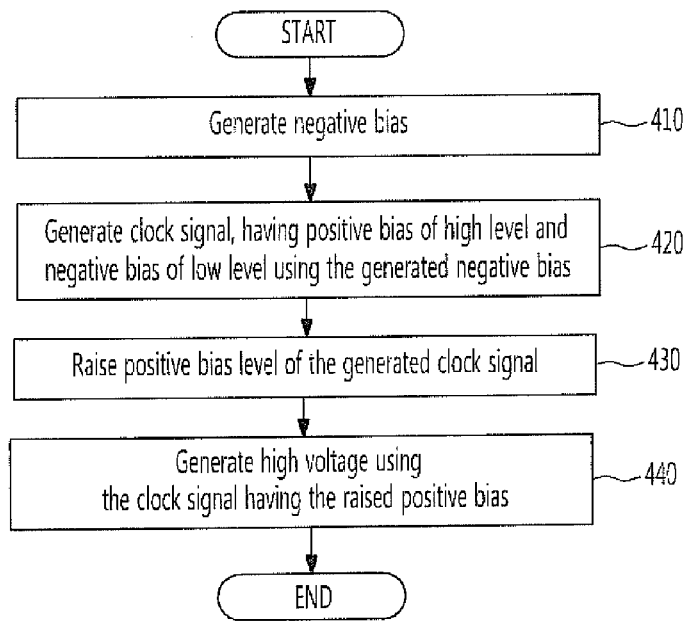
FIG. 4 is a flowchart illustrating a method of generating a high voltage according to an exemplary embodiment of this disclosure.

FIG. 4 is a flowchart illustrating a method of generating a high voltage according to an exemplary embodiment of this disclosure.

In the method of generating a high voltage, first, a negative bias is generated at step 410. The negative bias, as described above, may be generated by the negative bias generator 110 and may be predetermined.

Next, a clock signal, having high level equal to a positive bias and a low level equal to the negative bias, is generated at step 420. For example, at step 420 a clock signal that periodically oscillates between a positive bias Vcc and the negative bias −Vcc may be generated.

Then, at step 430, a positive bias of the clock signal is raised and the resulting clock signal is outputted as a second clock signal. The negative bias generated in step 410 is used in step 430 in order to generate the second clock signal, having the raised positive bias.

More specifically, step 430 includes outputting the negative bias as the voltage level of the second clock signal when the clock signal generated in step 420 is at a high level. Step 430 further includes charging a capacitor to a difference between a positive bias and a negative bias when the clock signal generated in step 420 is at a high level.

Step 430 further includes subsequently raising the positive bias of the clock signal generated in step 420 by the difference between the positive bias and the negative bias, which was charged to the capacitor, when the clock signal generated in step 420 is at a low level, and outputting the clock signal having the raised positive bias as a second clock signal.

In this manner, for example, the positive bias Vcc may be raised to three times the positive bias (3Vcc), and a second clock signal having voltage corresponding to the raised positive bias (e.g., 3Vcc) can be generated. That is, a second clock signal, oscillating between the raised positive bias (e.g., 3Vcc) and the negative bias −Vcc, can be generated.

Finally, at step 440, a high voltage is generated using the second clock signal having the raised positive bias. The high voltage can be generated by supplying the second clock signal having the raised positive bias to a charge pump having one or more stages, and outputting the high voltage from the last stage.

Exemplary embodiments of this disclosure are not necessarily implemented as an apparatus and a method, but may also be implemented as a program stored on a recording medium. Such implementations may be readily implemented by a person having ordinary skill in the art from the description of the exemplary embodiments.

The exemplary embodiments of this disclosure are advantageous in that they can obtain a higher voltage, or minimize the number of stages of a charge pump of a high voltage generator.

That is, in the exemplary embodiments of this disclosure, a negative bias is generated, and a clock doubling and clock differential concept is employed. Accordingly, the degree in which a voltage is raised through each stage of a charge pump may be increased. Consequently, a desired high voltage can be obtained, although the number of stages of the charge pumps is reduced. Furthermore, where the number of stages of the charge pumps is reduced, power consumption and the area occupied by the charge pumps can be reduced.

The exemplary embodiments of this disclosure may be applied to all semiconductor memory devices using circuits for generating high voltage.

What is claimed is:

1. A high voltage generator, comprising:
   a negative bias generator configured to generate a negative bias;
   a clock generator configured to generate a clock signal that toggles between a positive bias and the negative bias;
   a clock doubling circuit configured to raise the positive bias of the clock signal and to output the clock signal having the raised positive bias as a second clock signal; and
   a charge pump configured to generate a high voltage using the second clock signal having the raised positive bias.

2. The high voltage generator of claim 1, wherein the clock doubling circuit comprises:
   a capacitor;
   a negative bias transfer circuit configured to transfer the negative bias to an output terminal when the clock signal is at a first logic level;
   a capacitor charge circuit configured to charge the capacitor to a voltage level corresponding to a difference between the positive bias and the negative bias when the clock signal is at a first logic level; and
   a positive bias doubling circuit configured to raise the positive bias by the difference between the positive bias and the negative bias, which is charged to the capacitor, when the clock signal is at a second logic level, and to transfer the raised positive bias to the output terminal.

3. The high voltage generator of claim 2, wherein the negative bias transfer circuit comprises a first switching device coupled between the output terminal and a negative bias terminal, which supplies the negative bias.

4. The high voltage generator of claim 2, wherein the capacitor charge circuit comprises:
   a second switching device coupled between a positive bias terminal, which supplies the positive bias, and a first node; and
   a third switching device coupled between a second node and a negative bias terminal, which supplies the negative bias.

5. The high voltage generator of claim 2, wherein the positive bias doubling circuit comprises:
   a fourth switching device coupled between a positive bias terminal, which supplies the positive bias, and a second node; and
   a fifth switching device coupled between a first node and the output terminal.

6. The high voltage generator of claim 5, wherein the capacitor is coupled between the first node and the second node.

7. The high voltage generator of claim 2, wherein the first logic level is a high logic level of the clock signal and the second logic level is a low logic level of the clock signal.

8. The high voltage generator of claim 2, wherein the first logic level is a low logic level of the clock signal and the second logic level is a high logic level of the clock signal.

9. The high voltage generator of claim 1, wherein the negative bias is predetermined according to the design of the negative bias generator.

10. The high voltage generator of claim 1, wherein the absolute value of the negative bias is equal to the positive bias.

11. The high voltage generator of claim 1, wherein the high voltage has a greater voltage level than that of the positive bias.

12. The high voltage generator of claim 1, wherein the second clock signal toggles between the negative bias and a voltage that is equal to three times the positive bias.

13. The high voltage generator of claim 1, wherein the charge pump comprises:
    a first capacitor configured to receive the second clock signal at one terminal; and
    a first diode-coupled transistor having a gate that is coupled to the other terminal of the capacitor.

14. The high voltage generator of claim 13, wherein the charge pump further comprises:
    a second capacitor configured to receive an inverted version of the second clock signal at one terminal; and
    a second diode-coupled transistor having a gate that is coupled to the other terminal of the second capacitor and having a source/drain coupled to a drain/source of the first diode-coupled transistor.

15. A method of generating a high voltage, comprising:
    generating a negative bias;
    generating a clock signal that toggles between a positive bias and the negative bias;
    raising the positive bias of the clock signal; and
    generating the high voltage using the clock signal having the raised positive bias.

16. The method of claim 15, wherein raising the positive bias comprises:
    outputting the negative bias when the clock signal is at a first logic level;
    charging a capacitor to a voltage level corresponding to a difference between the positive bias and the negative bias when the clock signal is at a first logic level; and
    raising the positive bias by the difference between the positive bias and the negative bias, which is charged to the capacitor, when the clock signal is at a second logic level, and outputting the raised positive bias, 17. The method of claim 16, wherein the first logic level is a high logic level of the clock signal and the second logic level is a low logic level of the clock signal.

18. The method of claim 16, wherein the first logic level is a low logic level of the clock signal and the second logic level is a high logic level of the clock signal.

19. The method of claim 15, wherein the negative bias is predetermined according to the design of the negative bias generator.

20. The method of claim 15, wherein the absolute value of the negative bias is equal to the positive bias.

21. The method of claim 15, wherein the high voltage has a greater voltage level than that of the positive bias.

22. The method of claim 15, wherein the raising of the clock signal comprises outputting a second clock signal that toggles between the negative bias and a voltage that is equal to three times the positive bias.

* * * * *